Nov. 3, 1931.  A. M. F. VENAGO  1,830,144
CONTAINER
Filed March 9, 1931  2 Sheets-Sheet 1
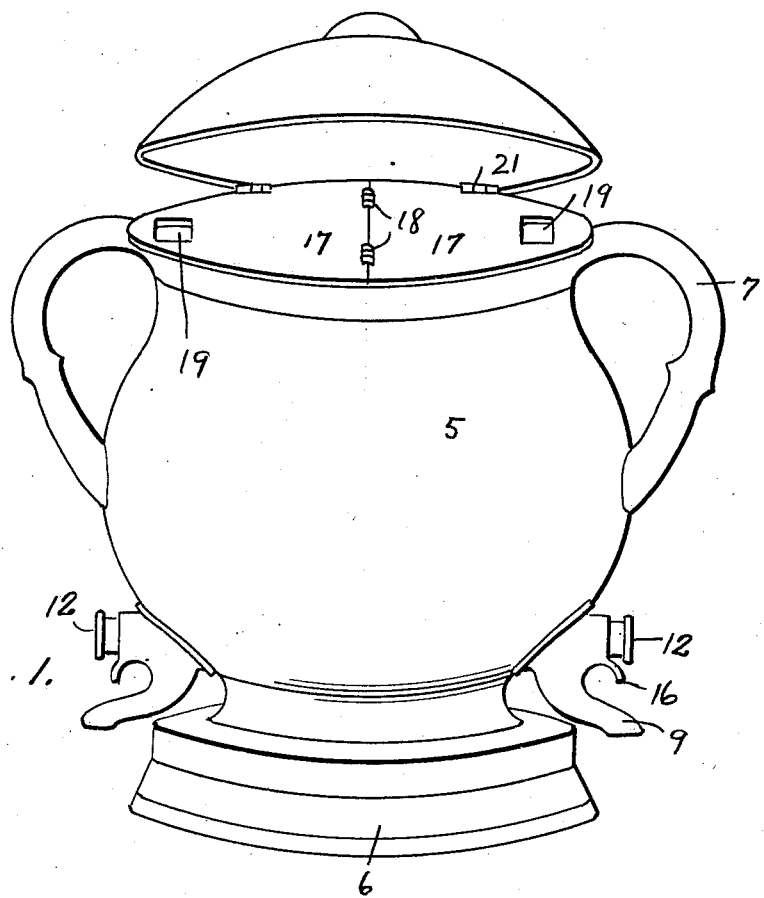
Fig. 1.
Fig. 2.
Inventor
A. Martin F. Venago
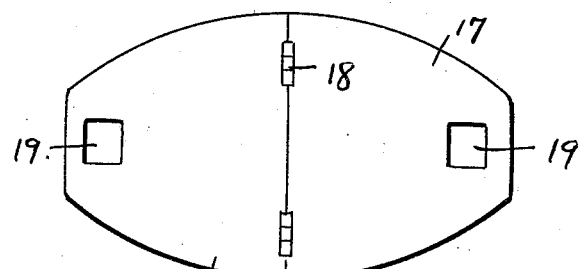
Attorney Nov. 3, 1931. A. M. F. VENAGO 1,830,144
CONTAINER
Filed March 9, 1931 2 Sheets-Sheet 2

Inventor
A. Martin F. Venago

By Clarence A. O'Brien
Attorney

Patented Nov. 3, 1931

1,830,144

UNITED STATES PATENT OFFICE

ARTURO MARTIN FALCON VENAGO, OF SAN FRANCISCO, CALIFORNIA

CONTAINER

Application filed March 9, 1931. Serial No. 521,337.

The present invention relates to a container for sugar, milk and the like and has for its prime object to provide a container compact in its construction for holding a supply of sugar and milk on a table so that persons sitting at the table may dispense the sugar and milk in their tea, coffee and the like with ease and economy, and in a perfectly sanitary manner.

A still further very important object of the invention resides in the provision of a container of this nature which is simple in its construction, inexpensive to manufacture, durable, attractive in appearance, easy to manipulate and thoroughly efficient and reliable in use and operation.

With the above and numerous other objects in view as will appear as the description proceeds, the invention resides in certain novel features of construction, and in the combination and arrangement of parts as will be hereinafter more fully described and claimed.

In the drawings:

Figure 1 is a perspective view of a container embodying the features of my invention.

Figure 2 is a plan view of the surface cover, and

Figure 3:
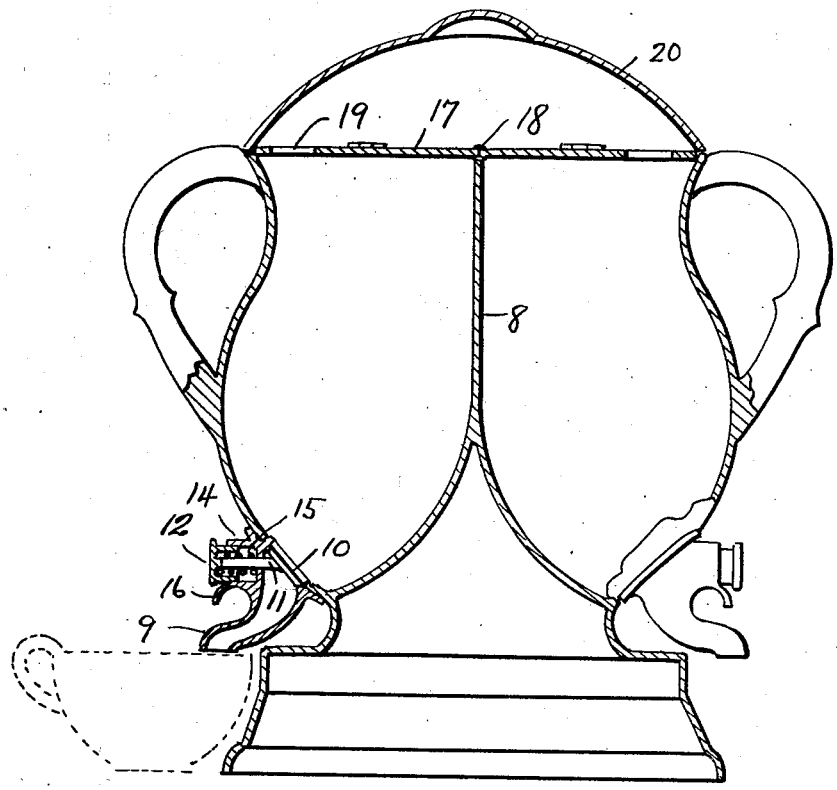
Figure 3 is a vertical section through the container.

Referring to the drawings in detail, it will be seen that numeral 5 denotes the body of the container rising from a base or stand structure 6. Suitable handles 7 may be provided on the body 5. A partition 8 divides the body into two compartments. Dispensing nozzles 9 incline downwardly and outwardly from openings in the compartments of the body at the lower ends thereof. The openings are controlled by valves 10 on stems 11 which terminate in buttons 12 slidable in cylinders 14 and spring pressed outwardly by springs 15. A finger grip 16 is formed on each cylinder 5 at the bottom thereof to facilitate manipulation of the valve to an open position. The stand or base 6 is sufficiently high so that a cup or the like may be readily placed under the nozzle 9.

A surface cover includes a pair of sections 17 hingedly connected as at 18 and these sections are provided with finger openings 19 so that either section may be swung to an open position. A lid 20 is hingedly mounted as at 21 on the upper edge of the body so as to swing closed over the surface cover.

It is thought that the construction, utility, operation and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A dispensing container of the class described comprising a hollow body, a partition dividing the body into compartments, a nozzle in communication with the lower part of each compartment, a spring-pressed valve for controlling the flow of material from each compartment into the nozzle, a hinged cover through each compartment, and a hinged cover for the body and enclosing the first-mentioned cover.

2. A dispensing container comprising a hollow body, a partition dividing the body into compartments, each compartment having an opening adjacent its lower end, nozzles connected with the body each communicating with an opening, spring pressed valves normally closing each opening, the stem of the valve passing through a part of the nozzle, a finger grip formed on the nozzle under the stem carrying part, a hinge lid for each compartment at the top thereof, and a hinged cover for the body and enclosing the lids.

In testimony whereof I affix my signature.

ARTURO MARTIN FALCON VENAGO.